Patented Apr. 23, 1935

1,998,442

UNITED STATES PATENT OFFICE 1,998,442

DICHLOROBUTADIENE AND PROCESS OF PREPARING SAME

Wallace H. Carothers, Fairville, Pa., and Gerard J. Berchet, Wilmington, Del., assignors to E. I. du Pont de Nemours & Company, Wilmington, Del., a corporation of Delaware No Drawing. Application January 26, 1932, Serial No. 589,053

14 Claims. (Cl. 260—165)

This invention relates to halogen-containing organic compounds and to a process for preparing the same. One specific aspect of the invention pertains to the treatment of tetrachlorobutane to produce useful products having a lower molecular chlorine content.

A copending application of Carothers and Berchet, Serial No. 589,052, filed January 26, 1932, now Patent No. 1,965,369 describes a new compound, dichloro-2,3-butadiene-1,3 and a method of preparing it. This compound is characterized by an extraordinary tendency to polymerize with the formation of hard, tough polymers which are very resistant to the action of solvents and chemical agents.

The process of preparing dichloro-2,3-butadiene-1,3 described in the application referred to above is somewhat complicated since it involves first the addition of hydrogen chloride to vinyl acetylene, the subsequent addition of chlorine to this hydrochloride and the removal of hydrogen chloride from the chlorine addition product. We have now found a simpler and more direct method for the preparation of dichloro-2,3-butadiene-1,3 and this method forms the subject of the present invention. This method consists in treating a tetrachlorobutane such as tetrachloro-1,2,3,4-butane with an alkaline agent capable of removing hydrogen chloride. The nature of the reaction is indicated in the following equation:

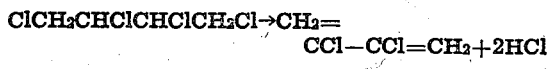
$$CCl-CCl=CH_2+2HCl$$

For the purposes of this invention the tetrachlorobutane may be obtained from any suitable source. A very simple and convenient method consists in chlorinating butadiene-1,3. It has already been shown by Henninger (Ann. Ch. (6) 7, 229 (1886)) and by Sorokin and Balikof (Chem. Abs., 20, 352 (1926)) that this process leads to the formation of tetrachloro-1,2,3,4-butane. The reaction is conveniently carried out by passing the butadiene and chlorine in separate gaseous streams into a common solvent such as carbon tetrachloride or carbon disulfide. The amount of the chlorine applied should be sufficient to provide two moles of chlorine for each mole of butadiene. The tetrachloro-1,2,3,4-butane is then obtained in a state of purity sufficient for the purpose in view by merely distilling or evaporating off the solvent used in the chlorination. The tetrachloro-1,2,3,4-butane exists in two stereoisomeric forms (Muskat and Northrup, J. Am. Chem. Soc., 52, 4043 (1930)) and it is possible to separate these by fractional distillation or crystallization, but this separation is not necessary for the purposes of the present invention.

We have also found that to obtain tetrachloro-1,2,3,4-butane of sufficient purity for the purposes of the present invention it is not necessary to start with pure butadiene, but hydrocarbon mixtures containing amounts of butadiene even as small as 5% may be used. Such hydrocarbon mixtures are available in large amounts as by-products from the cracking of petroleum to produce gasoline. Aside from butadiene, the substances present in these mixtures consist largely of isobutylene, propylene, butane, and other hydrocarbons that are much less active toward chlorine than is the butadiene. When such hydrocarbon mixtures are passed into a solvent together with an amount of chlorine sufficient only to provide one mole or slightly more of chlorine for each mole of butadiene contained in the mixture, the butadiene is almost entirely retained as chlorine addition products while the other hydrocarbons are largely unaffected and they either pass through the solvent unchanged or may be driven off subsequently by gentle heating. If the solvent is then treated with an excess of chlorine all of the butadiene-chlorine addition products are converted into tetrachloro-1,2,3,4-butane which may be recovered by evaporation of the solvent. This process provides an especially cheap and convenient source of tetrachloro-1,2,3,4-butane.

The nature of the process of the present invention is illustrated by the following example:

Example I

A solution of 150 g. of potassium hydroxide in 500 cc. of methyl alcohol is placed in a flask provided with a stirrer. To this is added in small portions with stirring, 234 g. of tetrachloro-1,2,3,4-butane. The temperature of the mixture is maintained between 10° C. and 18° C. After two hours, the potassium chloride is filtered off from the reaction mixture, the filtrate is diluted with a large volume of water, and the oil which separates is mixed with a small quantity of hydroquinone, dried, and distilled under reduced pressure. Two fractions were collected, one boiling at 29°–45° C. at 80 mm. and the other boiling at 45°–100° C. at 80 mm. The first of these is substantially pure dichloro-2,3-butadiene-1,3, a colorless liquid boiling at about 98° C. at atmospheric pressure, having a density of about 1.185 at 20° C., and having a refractive index of about 1.489.

It is to be understood that the example given above is illustrative only. Effects equivalent to that produced by the use of potassium hydroxide in the above example can be produced by the use of caustic alkali generally and by other agents capable of neutralizing hydrochloric acid, e. g., calcium oxide, magnesium oxide, tertiary amines such as pyridine and quinoline, etc. The presence of alcohol as a reaction medium is not essential. Other solvent liquids may be used for this purpose and it is possible, under certain conditions, to carry out the reaction in the absence of any liquid medium or diluent, for example, by heating together the tetrachlorobutane with finely powdered caustic or by passing the tetrachlorobutane as vapor over heated caustic. The temperature may be varied considerably from that used in the above example, but temperatures below 40° C. are preferred, where a solvent is used, as in the above example.

*Example II*

One thousand parts of powdered sodium hydroxide are placed in a vessel provided with a short fractionating column and 2000 parts of tetrachloro-1,2,3,4-butane are added in portions at such a rate that the heat of reaction causes rapid distillation. After all of the tetrachlorobutane has been added the pressure of the system is somewhat reduced, and the vessel is gently heated to complete the distillation of readily volatile material. The liquid in the receiver consists largely of dichloro-2,3-butadiene-1,3. It can be purified by distillation preferably in vacuo and in the presence of an antioxidant such as catechol.

Since dichloro-2,3-butadiene-1,3 is a thin, mobile liquid it is readily absorbed by porous or bibulous articles, such as cloth, paper, leather, wood, brick, unglazed porcelain, etc., the imbibed diene then being polymerized in situ as by subjecting to elevated temperature. As described in our Patent No. 1,965,369, dichloro-2,3-butadiene-1,3 may be polymerized alone or in the presence of other materials under a wide variety of conditions, to produce many different products.

Dichloro-2,3-butadiene-1,3 may also be polymerized in the presence of other polymeric materials such as phenol-formaldehyde resins, urea-formaldehyde resins, polybasic acid-polyhydric alcohol resins, thiourea-formaldehyde resins, vinyl resins, cumarone resins, rubber, chlorinated rubber, etc. It may also be polymerized in admixture with other substances capable of undergoing polymerization at the same time, such as styrene, vinyl chloride, vinyl acetate, indene, butadiene, and isoprene.

Although the invention has been described particularly with relation to the treatment of tetrachloro-1,2,3,4-butane, other tetrachlorobutanes may be treated in a similar manner with correlative results.

The above description and examples are illustrative only, and are not to be construed as limiting the invention to the specific details described. Any variation therefrom which conforms to the spirit of the invention is intended to be included within the scope of the claims.

We claim:

1. A process which comprises reacting tetrachloro-1,2,3,4-butane with an alkaline compound which will remove hydrogen chloride from the said chlorobutane.

2. A process for producing dichloro-2,3-butadiene-1,3 which comprises reacting tetrachloro-1,2,3,4-butane with an alkaline compound which will remove hydrogen chloride from the said chlorobutane.

3. A process for producing dichloro-2,3-butadiene-1,3 which comprises reacting tetrachloro-1,2,3,4-butane with an alkaline compound comprising a caustic alkali.

4. A process for producing dichloro-2,3-butadiene-1,3 which comprises reacting tetrachloro-1,2,3,4-butane with an alkaline compound comprising potassium hydroxide.

5. A process for producing dichloro-2,3-butadiene-1,3 which comprises reacting tetrachloro-1,2,3,4-butane with an alkaline compound comprising sodium hydroxide.

6. A process for producing dichloro-2,3-butadiene-1,3 which comprises reacting tetrachloro-1,2,3,4-butane with an alkaline compound comprising a caustic alkali dissolved in alcohol.

7. A process for producing dichloro-2,3-butadiene-1,3 which comprises reacting tetrachloro-1,2,3,4-butane with an alkaline compound which will remove hydrogen chloride from the said chlorobutane, at a temperature below 40° C.

8. A process for producing dichloro-2,3-butadiene-1,3 which comprises reacting tetrachloro-1,2,3,4-butane with an alkaline compound which will remove hydrogen chloride from the said chlorobutane, for a period of time and in an amount sufficient to split off two molecules of hydrogen chloride.

9. A process for producing dichloro-2,3-butadiene-1,3 which comprises reacting tetrachloro-1,2,3,4-butane with an alkaline compound which will remove hydrogen chloride from the said chlorobutane, at a temperature of 10° C.–18° C. for a period of about two hours.

10. A process for producing dichloro-2,3-butadiene-1,3 which comprises reacting tetrachloro-1,2,3,4-butane with an alkaline compound which will remove hydrogen chloride from the chlorobutane, in the presence of a solvent for the tetrachloro-1,2,3,4-butane.

11. The process described in claim 7 in which the reaction is accompanied by vigorous stirring.

12. A process for producing dichloro-2,3-butadiene-1,3 which comprises reacting tetrachloro-1,2,3,4-butane with an alkali metal hydroxide at a temperature of about 10° to 18° C.

13. The process of claim 12 in which the reaction is carried out in the presence of a solvent for the hydroxide.

14. The process of claim 12 in which the reaction is carried out in the presence of a solvent for the hydroxide, and the reaction product is subjected to fractional distillation in the presence of a polymerization inhibitor.

WALLACE H. CAROTHERS.
GERARD J. BERCHET.